Jan. 15, 1963 S. FINGERHUT 3,073,475
PRESSURE VESSEL AND METHOD OF MAKING THE SAME
Filed Oct. 30, 1959
3 Sheets-Sheet 1
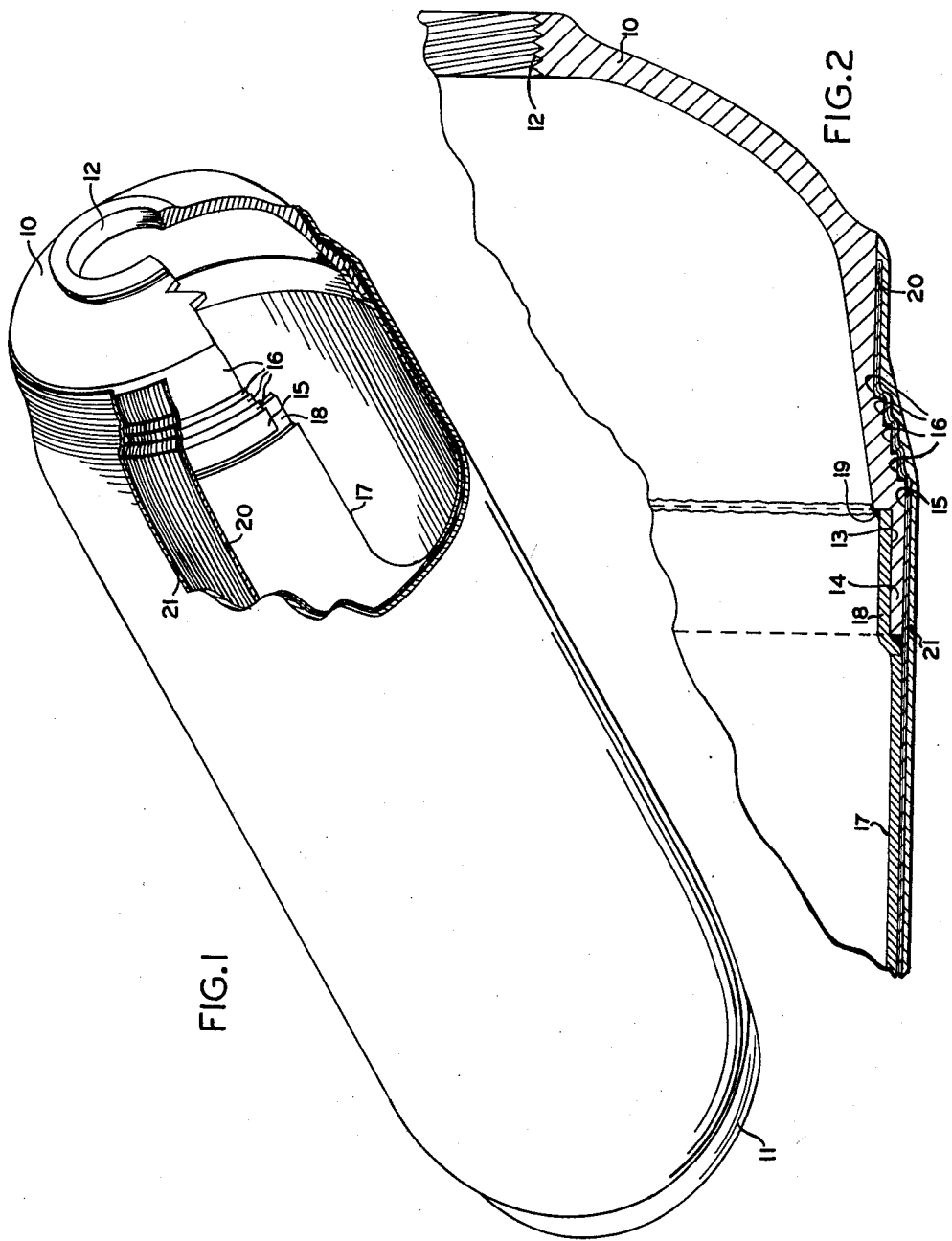
INVENTOR.
SOLOMON FINGERHUT
BY
*Carpenter Abbott Coulter & Kinney*
ATTORNEYS

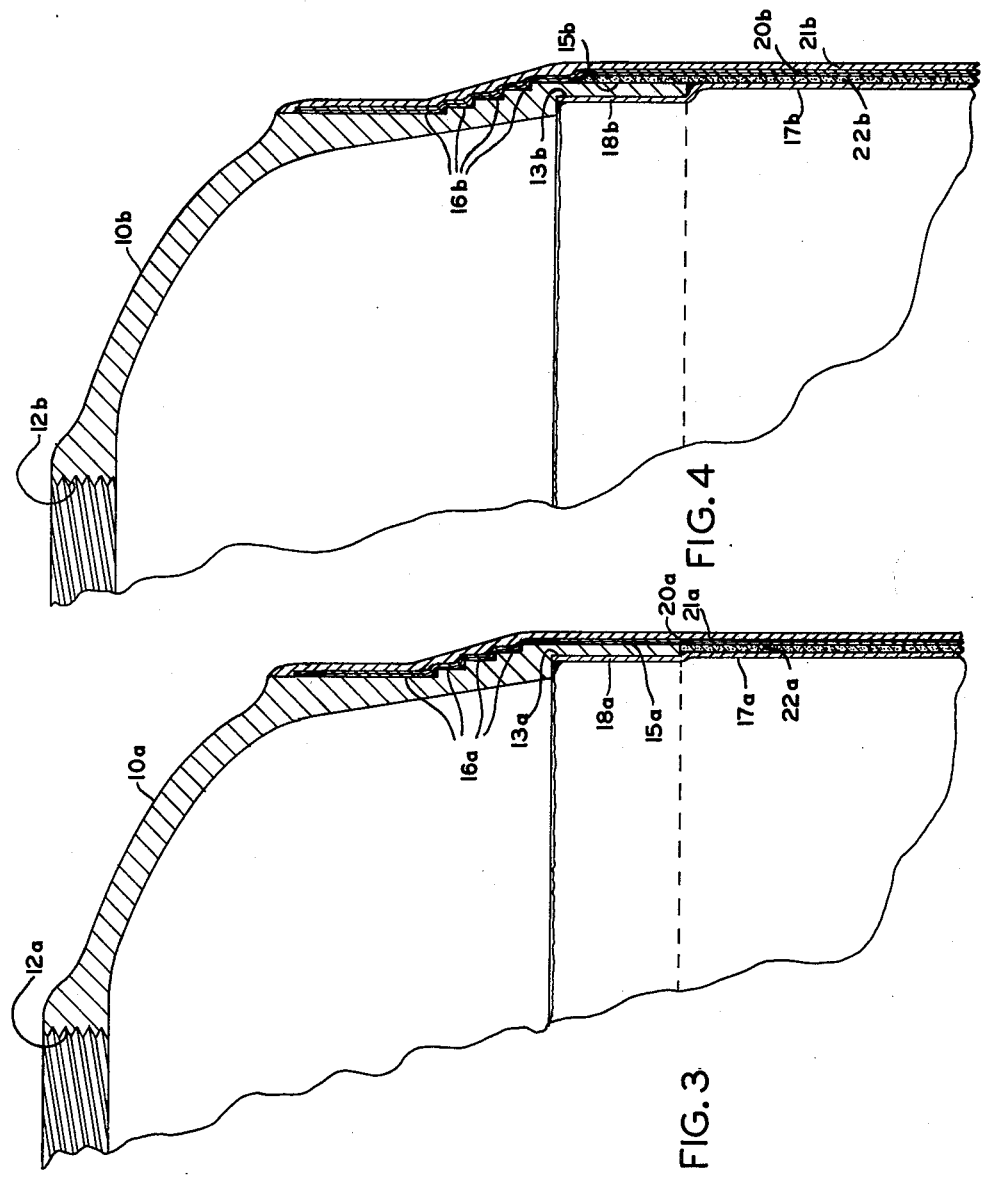

Jan. 15, 1963  S. FINGERHUT  3,073,475
PRESSURE VESSEL AND METHOD OF MAKING THE SAME
Filed Oct. 30, 1959  3 Sheets-Sheet 3

INVENTOR.
SOLOMON FINGERHUT
BY
Carpenter Abbott Coulter & Kinney
ATTORNEYS

United States Patent Office 3,073,475
Patented Jan. 15, 1963

3,073,475
PRESSURE VESSEL AND METHOD OF
MAKING THE SAME
Solomon Fingerhut, Los Angeles, Calif., assignor, by mesne assignments, to Minnesota Mining and Manufacturing Company, St. Paul, Minn., a corporation of Delaware
Filed Oct. 30, 1959, Ser. No. 849,820
12 Claims. (Cl. 220—3)

This invention relates to improvements in pressure vessels and to the method of making such vessels.

In both commercial and military applications there is need for a low cost pressure vessel having a high strength-to-weight ratio and immunity from any deleterious effects of the contained fluid. In the search for a pressure vessel having the aforementioned desirable characteristics, resort has logically been had to the use of such materials as resin-bonded glass fibers. The vessels thus far produced have not been entirely satisfactory, however, since they failed to provide one or more of the aforementioned desirable characteristics. Known methods of forming pressure vessels, domestic water softener tanks for example, include the use of meltable cores, centrifugal molds and inflatable bladders. Each of these expedients is expensive not only because expensive equipment is needed but also because of the need for skilled labor in the fabrication.

Apart from these problems of fabrication the cost picture is further complicated by the fact that when conventional vessel structures of laminated resin-bonded fabrics are used as containers of liquids such as water it is necessary to make the vessel walls substantially thicker than is required to initially withstand the expected internal pressures. Such overdesign is required because of the fact that contact of the load bearing laminate with the liquid causes degradation of the laminate, i.e. weakening of the bond between the resin and the filaments, with concomitant weakening of the laminate. Not only does such overdesign results in an undesirably lower strength-to-weight ratio, but it also results in increased cost of both materials and labor.

With the above in mind, it is therefore a general object of the present invention to provide an improved pressure vessel fabricated of resin-bonded filaments arranged in a manner to provide maximum materials efficiency affording a high strength-to-weight ratio.

Another object of the invention is to provide a pressure vessel of the aforementioned character which is not adversely affected by the contained fluid and therefore does not suffer any change in its strength characteristics with continued use.

Another object of the invention is to provide an improved pressure vessel of the class described which is low in cost due to the use of minimum amounts of component materials, as well as to the fact that the structure lends itself well to manufacture by mass production techniques not requiring the employment of skilled labor.

Still another object of the invention is to provide an improved method of making a pressure vessel of the aforementioned character.

Other and further objects of the invention will become apparent as the description proceeds, reference being had to the drawings accompanying and forming a part of this specification and in which:

FIGURE 1 is a perspective view of one form of pressure vessel constructed in accordance with the principles of the invention, parts being broken away and shown in section;

FIGURE 2 is a fragmentary axial sectional view of one end of the pressure vessel of FIGURE 1;

Figure 6:
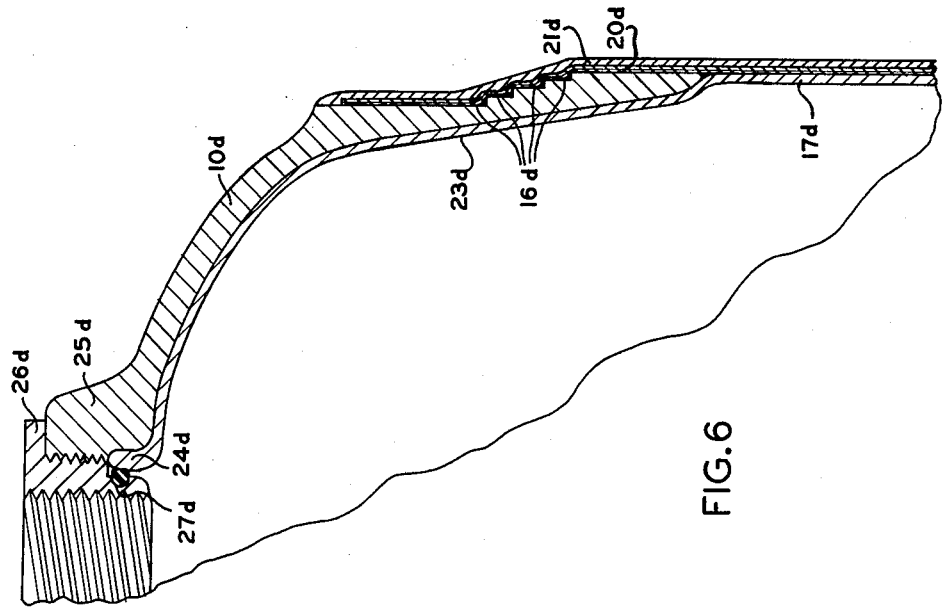
Figure 5:
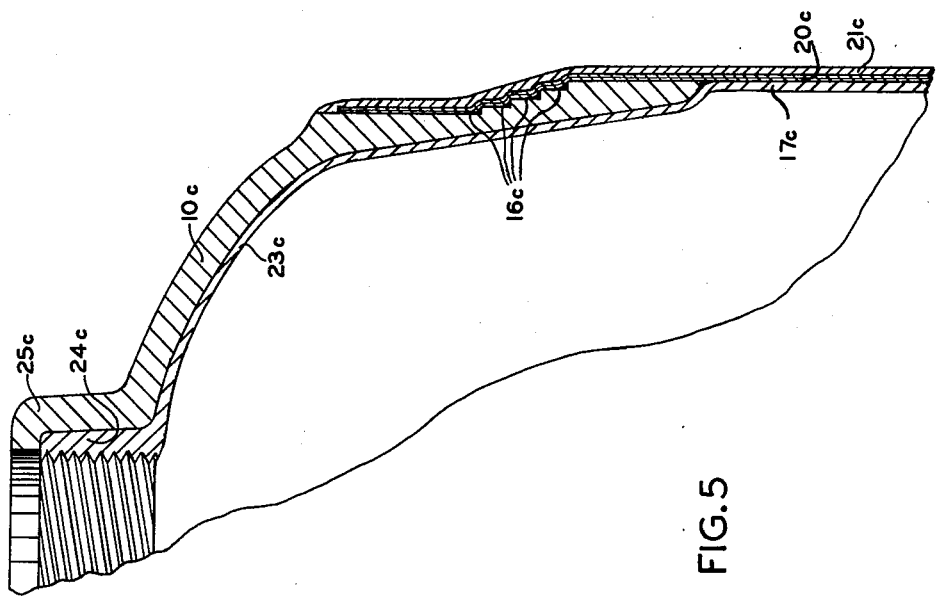

FIGURES 3 and 4 are views similar to FIGURE 2 showing the use of a thin gauge liner in conjunction with a fiber core; and FIGURES 5 and 6 are views similar to FIGURES 1, 3 and 4 illustrating forms of the invention in which the liner is provided with end walls covering the inner surfaces of the end caps.

Referring more particularly to FIGURES 1 and 2 of the drawing, the pressure vessel selected for illustration therein comprises a pair of spaced cup-shaped generally hemispherical end caps 10 and 11 which may be identical, and only one of which will be described in detail. The end caps 10 and 11 are desirably molded of fluid impermeable reinforced plastic material, for example random two-inch fiberglass filaments bonded together by cured polyester resin. The caps 10 and 11 may also be provided with one or more suitable access holes, for example the internally threaded axial hole 12. As shown most clearly in FIGURE 2, end cap 10 at its open end may be formed with a counterbore 13 to provide a lip 14, and the lip 14 is preferably formed with a cylindrical outer surface 15 which extends toward the closed end of the cap 10 beyond the counterbore 13 as shown. The cap 10 is formed with a plurality of coaxial external cylindrical surface portions 16 of successively reduced diameter defining coaxial annular shoulders therebetween, the smallest diameter one of said cylindrical surfaces preferably having an axial length substantially greater than those of the others, for example a length approximating that of the cylindrical surface 15. A tubular cylindrical liner 17 of fluid impermeable plastic, for example high impact polystyrene, has a main body portion the outer diameter of which is substantially equal to that of the cylindrical surface 15 of the end cap 10. The liner 17 has opposite end portions 18 of reduced inner and outer diameter sized to snugly telescope into the counterbores 13 of the end caps 10 and 11. The end portions 18 of the liner 17 are sealed to the surfaces of the counterbores 13 by a suitable sealant, for example rubber cement, which appears in FIGURE 2 only at 19.

Overlaying the main body portion of the liner 17, as well as the lip portion 14 and shouldered portions of the end caps 10 and 11 defined by the cylindrical surfaces 16, is a layer 20 of axially extending unidirectional filaments, for example of fiberglass, which are stressed in tension and are resin-bonded to each other as well as to said liner, lip and shouldered portions. Overlaying and bonded to the layer 20 and to the end cap 10 is a layer 21 of circumferentially wound resin-bonded filaments, for example glass roving.

It will be observed that the impermeable liner 17 prevents contact of the contained fluid with the load bearing laminate comprising layers 20 and 21. No allowance, therefore, need made for degradation of the load bearing laminate. Further, since the resin serves only as a bonding agent holding the filaments in place, rather than also acting as a water seal, a relatively small quantity of resin is required. Stressing of the filaments in tension affords the maximum materials efficiency, and since no overdesign is required, the wall thickness of the load bearing laminate can be substantially less than that used in prior art pressure vessels. The net result is a non-metallic pressure vessel having a strength-to-weight ratio substantially higher than anything heretofore attainable in vessels of this type.

The manufacture of the improved pressure vessel is carried out by a novel method which is well adapted for mass production techniques and does not require skilled labor. More particularly the improved pressure vessel is fabricated as follows:

The preformed reinforced plastic end caps 10 and 11 are telescoped over the opposite end portions 18 of the liner 17 and sealed thereto by means of the sealant 19.

The liner 18, while being relatively elastic, i.e. more elastic than the load bearing laminate comprising layers 20 and 21, nevertheless has sufficient rigidity to function with the end caps 10 and 11 as a mandrel which is substantially undeformable under the stresses incident to the application of the load bearing laminate thereto. The sub-assembly of liner 17 and end caps 10 and 11 is then supported in suitable rotary supporting means by engagement with the end caps 10 and 11, apparatus in the nature of a lathe having suitable motor means being well adapted for this purpose. The unidirectional axially extending filaments of the layer 20 are then applied to the aforementioned sub-assembly in the form of a mat in which said filaments are lightly bonded to a diaphanous supporting veil of reticulated glass filaments. One or more convolutions of the mat may be applied, depending upon the thickness of the layer 20 desired. The mat of longitudinal filaments is then impregnated, for example by spraying, with a liquid resin such as unsaturated polyester.

The layer 21 is then applied to the composite of layer 17, end caps 10 and 11 and layer 20 by axially rotating the composite and circumferentially winding, under substantial tensile stress, suitable filament means such as glass roving, which is immersed in liquid resin such as unsaturated polyester. The circumferential winding is initiated in a central portion of the composite and is continued axially at a uniform rate of advance toward the end cap 10 in a manner to smooth out any irregularities in the axially extending filaments of the layer 20. As the circumferential winding proceeds over the end cap 10, the longitudinal filaments in the layer 20 are pressed radially inwardly into engagement with the cylindrical surfaces 16 of the end cap and the shoulders defined thereby, imparting a correspondingly stepped configuration to said axial filaments, said configuration facilitating the application of the circumferential winding and eliminating any tendency thereof to slip axially of the end cap 10. The circumferential winding is carried to the outer end of the outermost surface 16 of the end cap 10 and beyond the adjacent end of the layer 20, and the direction of advance thereof is then reversed. The winding is continued, overrunning the central portion of the composite and smoothing out any irregularities in the previously uncovered portion of the layer 20. As the circumferential winding proceeds over the shouldered portion of the end cap 11, the resultant pressing of the axial filaments of the layer 20 radially inwardly into engagement with the shouldered portion of said end cap tensilizes said axially extending filaments. The circumferential winding proceeds to the outer end of the outermost cylindrical surface 16 of the end cap 11 and beyond the adjacent end of the layer 20, and the direction of advance is again reversed. The winding is continued back to the starting point in the central portion of the composite and may be thereupon terminated.

The vessel thus formed is removed from the winding apparatus and is subjected to a suitable curing operation to polymerize, i.e. harden, the resin binder. The particular curing operation performed depends upon the catalyst employed in the resin and it may, for example, take the form of subjection of the vessel to heat or to ultra-violet light. Upon completion of the curing operation, the vessel is ready for use. As previously pointed out, the fluid impermeable liner 17 prevents any contact of the load bearing laminate comprising the liners 20 and 21 with the contained fluid. Moreover, it has sufficient elasticity to expand and contract with the load bearing laminate upon fluctuations in pressure within the vessel. The liner 17 provides the further advantage that the vessel is not subject to leakage even upon impactual engagement with relatively sharp objects with the load bearing laminate. In the absence of the liner 17 a blow of this type, though not substantially reducing the strength of the laminate, would nevertheless cause leakage through the laminate at the point of impact rendering the vessel useless for its intended purpose. The bonding of the axially extending filaments of the layer 20 to the surfaces 16 to the end caps and the shoulders defined thereby, together with the reduction in diameter of the load bearing laminate over the shouldered areas of the end caps, provides a gripping action resisting any axial pressures on the end caps tending to cause displacement of the latter from the laminate. Further, the axially elongated character of the smallest diameter, i.e. outermost, cylindrical surface 16 results in a tightness of the circumferential wind thereon which is greater than that on the shorter adjacent cylindrical surfaces 16 and contributes, in a major degree, toward the excellent resistance to leakage characteristics of the vessel.

It has been found that vessels constructed according to the present invention having an approximate diameter of 8 inches and length of 36 inches, utilizing a high impact polystyrene liner 17 having a wall thickness of from 0.030 to 0.100 inch, a layer 20 of 0.035 inch thickness and a layer 21 of 0.055 inch thickness successfully withstand an internal pressure of from 650 to 1400 pounds per square inch. Moreover, subjection of such vessels to well over 200,000 cycles of pressures from 0 to 150 pounds per square inch indicates no tendency whatever toward leakage or rupture. The weight of a vessel of this type is approximately 6.3 pounds as compared with a weight of 9.5 pounds for a vessel of similar capacity and conventional construction. It is estimated that the improved vessel construction effects a saving of the order of 30% in material cost and a saving of the order of 25% in labor cost over vessels of similar capacity and strength and conventional construction.

FIGURES 3 and 4 illustrate two forms of the invention in which liners 17a and 17b therein are substantially thinner than the liner 17 of FIGURE 2 and therefore cost substantially less. In order to provide the necessary rigidity to withstand the stresses incident to the application of the load bearing laminate, tubular cores 22a and 22b, for example of carboard or other suitable material, are telescoped over the liners 17a and 17b respectively. In FIGURE 3 the core 22a abuts the lips of the end caps and has an outer diameter equal to the diameter of the cylindrical lip surface 15a. In FIGURE 4 the core 22b is telescoped over the cylindrical lip surface 15b as well as over the liner 17b as shown. In making the forms of the invention shown in FIGURES 3 and 4, the layers 20a and 21a and 20b and 21b are applied to the composite of liner, core and end caps in substantially the same manner as set forth in connection with application of the layers 20 and 21 in FIGURES 1 and 2.

FIGURES 5 and 6 illustrate forms of the invention in which the liners 17c and 17d, instead of being open-ended tubular structures, are provided with generally hemispherical end walls 23c and 23d which are complemental with and overlay the inner surfaces of the end caps 10c and 10d respectively. A similar relationship of liner end wall and end cap may occur at the opposite ends of the vessels. In FIGURE 5 the liner end wall 23c is provided with an internally threaded axial boss 24c telescoped within a tubular boss 25c on the end cap 10c as shown. In FIGURE 6 the end cap 10d is provided with an internally threaded axial boss 25d, and the end wall 23d of the liner 17d is provided with a coaxial tubular extension 24d having a sealing connection with an internally threaded fitting 26d threaded into the boss 25d and carrying an O-ring seal 27d.

The forms of the invention shown in FIGURES 5 and 6 prevent exposure of the end caps 10c and 10d to the contained fluid and are particularly well adapted for use with contained fluids which have a deleterious effect upon the materials of the end caps as well as on the materials of the load bearing laminate. The liners 17c and 17d, like the other liners 17, 17a and 17b, may be of any suitable or desired material selected to best suit the particular application.

The forms of the invention shown were selected for the purpose of facilitating the disclosure rather than as limitative of the forms which the invention may assume or of the uses to which the invention may be put. Various changes and modifications may be made to meet the requirements of practice without in any way departing from the spirit of the invention, and all of such changes are contemplated as may come within the scope of the appended claims.

What is claimed as the invention is:

1. A hollow pressure vessel or the like comprising a generally cylindrical tubular liner, a cup-shaped end cap having a lip portion in telescoped relation with one end of said liner, said lip portion being formed with a substantially cylindrical first external surface, said cap being formed with a reduced diameter coaxial substantially cylindrical second external surface defining with said first surface a coaxial annular shoulder, the axial dimension of each of said first and second cylindrical surfaces being substantially greater than the radial dimension of said annular shoulder between said cylindrical surfaces, a first layer of nonwoven unidirectional filament means formed substantially entirely of substantially straight filaments extending generally parallel with the axis of said liner and overlaying said liner, said first and second surfaces and said shoulder, a second layer of filament means wound circumferentially in overlaying relation with respect to said first layer and pressing said first layer into engagement with said first and second surfaces and said shoulder, and a hardened resinous binder impregnating said first and second layers.

2. A hollow pressure vessel or the like according to claim 1 wherein said liner has a generally hemispherical end wall, said end cap being telescoped over said liner and having an inner surface conforming to the shape of said liner end wall.

3. A hollow pressure vessel or the like according to claim 1 wherein there is a preformed tubular core in telescoped relation with respect to at least the main body portion of said liner.

4. A hollow pressure vessel or the like according to claim 1 wherein said end cap is formed with a plurality of successively reduced diameter substantially cylindrical second external surfaces coaxial with said first surface thereof, the axially outermost of said cylindrical external surfaces having the smallest diameter and also having an axial dimension greater than those of the other cylindrical second surfaces.

5. A hollow pressure vessel or the like comprising a generally cylindrical tubular liner, a cup-shaped end cap having a lip portion in telescoped relation with one end of said liner, said lip portion being formed with a substantially cylindrical first external surface substantially flush with the external surface of the main body portion of said liner, said cap being formed with a plurality of successively reduced diameter coaxial substantially cylindrical second external surfaces defining a plurality of coaxial annular shoulders, a first layer of nonwoven unidirectional filament means formed substantially entirely of substantially straight filaments extending generally parallel with the axis of said liner and overlaying said liner, said first and second surfaces, and said shoulders a second layer of filament means wound circumferentially in overlaying relation with respect to said first layer and pressing said first layer into engagement with said first and second surfaces and said shoulders, and a hardened resinous binder impregnating said first and second layers.

6. A hollow pressure vessel or the like comprising a generally cylindrical tubular liner, a pair of cup-shaped end caps respectively having lip portions in telescoped relation with the opposite ends of said liner, the lip portion of each end cap being formed with a substantially cylindrical first external surface, and each end cap also being formed with a reduced diameter substantially cylindrical second external surface coaxial with the first surface thereof and defining therewith a coaxial annular shoulder, a first layer of nonwoven unidirectional filament means formed substantially entirely of substantially straight filaments extending generally parallel with the axis of said liner and overlaying said liner as well as said first and second surfaces and said shoulder of each end cap, a second layer of filament means wound circumferentially in overlaying relation with respect to said first layer and pressing portions of said first layer into engagement with said first and second surfaces and said shoulders of said end caps to stress said unidirectional filament means in tension, and a hardened resinous binder impregnating said first and second layers.

7. A hollow pressure vessel or the like according to claim 6 wherein said liner has a pair of generally hemispherical opposite end walls, said end caps being telescoped over said liner end walls respectively and each of said end caps having an inner surface conforming to the shape of the associated liner end wall.

8. A hollow pressure vessel or the like comprising a generally cylindrical tubular liner, a pair of cup-shaped end caps respectively having lip portions in telescoped relation with the opposite ends of said liner, the lip portion of each end cap being formed with a substantially cylindrical first external surface, and each end cap also being formed with a reduced diameter substantially cylindrical second external surface coaxial with the first surface thereof and defining therewith a coaxial annular shoulder, the axial dimension of each of said first and second cylindrical surfaces of each end cap being substantially greater than the radial dimension of said annular shoulder between said cylindrical surfaces, a first layer of nonwoven unidirectional filament means formed substantially entirely of substantially straight filaments extending generally parallel with the axis of said liner and overlaying said liner as well as said first and second surfaces and said shoulder of each end cap, a second layer of filament means wound circumferentially in overlaying relation with respect to said first layer and pressing portions of said first layer into engagement with said first and second surfaces and said shoulders of said end caps to stress said unidirectional filament means in tension, and a hardened resinous binder impregnating said first and second layers.

9. A hollow pressure vessel or the like comprising a generally cylindrical tubular liner, a pair of cup-shaped end caps respectively having lip portions in telescoped relation with the opposite ends of said liner, the lip portion of each end cap being formed with a substantially cylindrical first external surface, and each end cap also being formed with a plurality of successively reduced diameter substantially cylindrical second external surfaces coaxial with the first surface thereof and defining therewith a plurality of coaxial annular shoulders, a first layer of nonwoven unidirectional filament means formed substantially entirely of substantially straight filaments extending generally parallel with the axis of said liner and overlaying said liner as well as said first and second surfaces and said shoulders of each end cap, a second layer of filament means wound circumferentially in overlaying relation with respect to said first layer and pressing portions of said first layer into engagement with said first and second surfaces and said shoulders of said end caps to stress said unidirectional filament means in tension, and a hardened resinous binder impregnating said first and second layers.

10. A hollow pressure vessel or the like comprising a generally cylindrical tubular liner having opposite end portions of reduced diameter, a pair of cup-shaped end caps respectively having lip portions in telescoped relation with the opposite ends of said liner, the lip portion of each end cap being formed with a substantially cylindrical first external surface coaxial and substantially flush with the external surface of the main body portion of said liner, and each end cap also being formed with a reduced diameter substantially cylindrical second external surface coaxial with the first surface thereof and defining therewith a coaxial annular shoulder, a first layer of nonwoven unidirectional filament means formed substantially entirely of substantially straight filaments extending generally parallel with the axis of said liner and overlaying said liner as well as said first and second surfaces and said shoulder of each end cap, a second layer of filament means wound circumferentialy in overlaying relation with respect to said first layer and pressing portions of said first layer into engagement with said first and second surfaces and said shoulders of said end caps to stress said unidirectional filament means in tension, and a hardened resinous binder impregnating said first and second layers.

11. A hollow pressure vessel or the like comprising a relatively thin generally cylindrical tubular fluid impermeable plastic liner, a pair of cup-shaped end caps respectively having lip portions in telescoped relation with the opposite ends of said liner, the lip portion of each end cap beinng formed with a substantially cylindrical first external surface, and each end cap also being formed with a reduced diameter substantially cylindrical second external surface coaxial with the first surface thereof and defining therewith a coaxial annular shoulder, a preformed tubular core in telescoped relation with respect to at least the main body portion of said liner, a first layer of nonwoven unidirectional filament means formed substantially entirely of substantially straight filaments extending generally parallel with the axis of said liner and overlaying said telescoped core and liner as well as said first and second surfaces and said shoulder of each end cap, a second layer of filament means wound circumferentially in overlaying relation with respect to said first layer and pressing portions of said first layer into engagement with said first and second surfaces and said shoulders of said end caps to stress said unidirectional filament means in tension, said core having at least sufficient rigidity to resist substantial deformation under stresses imposed by winding said circumferential filament means thereon, and a hardened resinous binder impregnating said first and second layers.

12. A hollow pressure vessel or the like comprising a generally cylindrical tubular liner, a pair of cup-shaped end caps respectively having lip portions in telescoped relation with the opposite ends of said liner, the lip portion of each end cap being formed with a substantially cylindrical first external surface, and each end cap also being formed with a plurality of successively reduced diameter substantially cylindrical second external surfaces coaxial with the first surface thereof and defining therewith a plurality of coaxial annular shoulders, the axially outermost of said cylindrical second external surfaces having the smallest diameter and also having an axial dimension greater than those of the other cylindrical second external surfaces, a first layer nonwoven unidirectional filament means formed substantially entirely of substantially straight filaments extending generally parallel with the axis of said liner and overlaying said liner as well as said first and second surfaces and said shoulders of each end cap, a second layer of filament means wound circumferentially in overlaying relation with respect to said first layer and pressing portions of said first layer into engagement with said first and second surfaces and said shoulders of said end caps to stress said unidirectional filament means in tension, and a hardened resinous binder impregnating said first and second layers.

References Cited in the file of this patent

UNITED STATES PATENTS

| | | |
|---|---|---|
| 2,718,583 | Noland | Sept. 20, 1955 |
| 2,744,043 | Ramberg | May 1, 1956 |
| 2,809,762 | Cardona | Oct. 15, 1957 |
| 2,827,195 | Kearns | Mar. 18, 1958 |
| 2,915,425 | Biedebach et al. | Dec. 1, 1959 |